(12) United States Patent
Chen et al.

(10) Patent No.: US 7,236,311 B1
(45) Date of Patent: Jun. 26, 2007

(54) MANUALLY ADJUSTABLE APPARATUS FOR A ZOOM LENS

(75) Inventors: Yi-Yuan Chen, Taipei (TW); Lin-Yun Wu, Taipei (TW)

(73) Assignee: Hon Hai Precision Industry Co. Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/451,388

(22) Filed: Jun. 13, 2006

(51) Int. Cl.
*G02B 15/14* (2006.01)
(52) U.S. Cl. .................. 359/694; 359/811; 359/819
(58) Field of Classification Search ............... 359/676, 359/694, 811, 819, 827
See application file for complete search history.

(56) References Cited

U.S. PATENT DOCUMENTS 4,600,277 A * 7/1986 Murray, Jr. ............ 359/423
6,236,519 B1 * 5/2001 Oka ........................ 359/700
2005/0286143 A1 * 12/2005 Chen ....................... 359/704

* cited by examiner

*Primary Examiner*—Timothy Thompson
*Assistant Examiner*—Jerry Fang
(74) *Attorney, Agent, or Firm*—Jeffrey T. Knapp

(57) ABSTRACT

A manually adjustable apparatus for a zoom lens includes a body, a lens set, a sliding base, a rack sliding base, and a transmission gear. The lens set is installed at the body. There is an outer gear located at the rear end of the lens cone of the lens set. The sliding base is fastened at the body. On the bottom surface of the rack sliding base, there is a rack. The transmission gear is pivoted on the body and is interlocked with the rack and the outer gear. The present invention turns the rack sliding base manually to make the lens cone rotate and move via the rack, the transmission gear, and the outer gear for controlling and zooming the lens set. No power is needed so that the power loading of the still camera is reduced, and the cost of the still camera is reduced.

8 Claims, 7 Drawing Sheets

MANUALLY ADJUSTABLE APPARATUS FOR A ZOOM LENS

BACKGROUND OF THE INVENTION

1. Field of the Invention

The present invention relates to a manually adjustable apparatus for a zoom lens. In particular, this invention utilizes a manually adjustable apparatus to make a lens cone rotate and move so as to adjust the zoom lens.

2. Description of the Related Art

As the technology of digital still cameras has developed, the functions provided are maturing and becoming better than those provided by conventional still cameras. Some digital still cameras provide a zoom lens that enables the user to adjust the lens so that a picture of the desired area can be taken even at a far off distance. Therefore, digital still cameras are developing the same full functions provided by conventional still cameras.

Digital still cameras having the zoom function usually use a motor to control the movement of the lens. Although the user can press a key to zoom the lens, the digital still camera requires more power to drive the motor. The user needs to repeatedly recharge the battery of the digital still camera. It is inconvenient and the cost of the digital still camera is increased.

SUMMARY OF THE INVENTION

One particular aspect of the present invention is to provide a manually adjustable apparatus for a zoom lens. The present invention makes the lens cone rotate and move via a manual method to control and zoom the lens. Power is not required. It reduces the power loading of the still camera. The problem of repeatedly recharging the battery is solved and the cost of the still camera is also decreased.

The manually adjustable apparatus for a zoom lens includes a body, a lens set installed at the body, a sliding base fastened at the body, a rack sliding base, and a transmission gear. The lens set has a zooming lens cone and the lens cone has an outer gear. The rack sliding base is movably installed at the sliding base and the rack sliding base has a rack. The transmission gear is interlocked with the rack and the outer gear.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
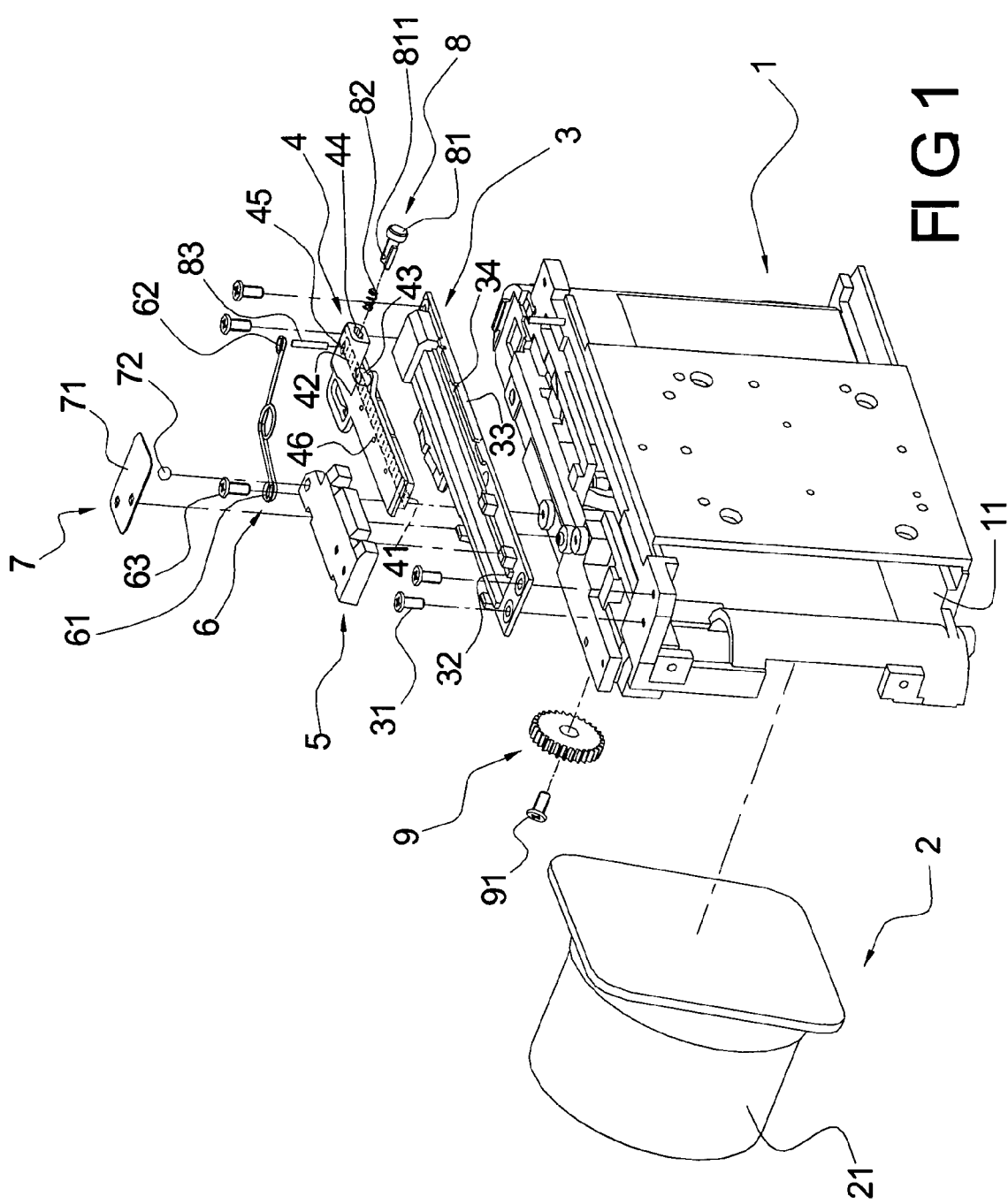
FIG. 1 is an exploded perspective view of the manually adjustable apparatus for a zoom lens of the present invention.
Figure 2:
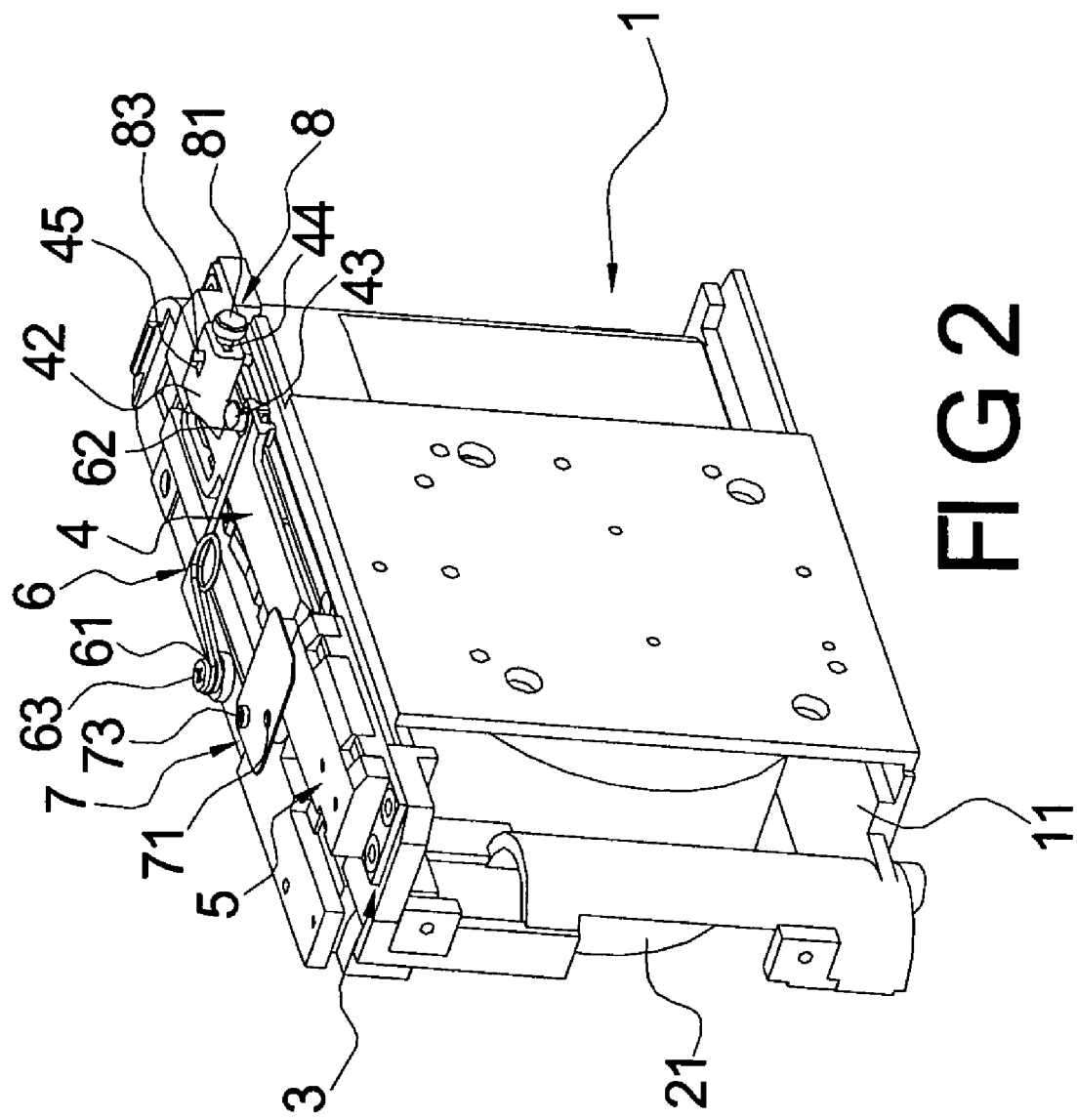
FIG. 2 is a perspective view of the manually adjustable apparatus for a zoom lens of the present invention.
Figure 3:
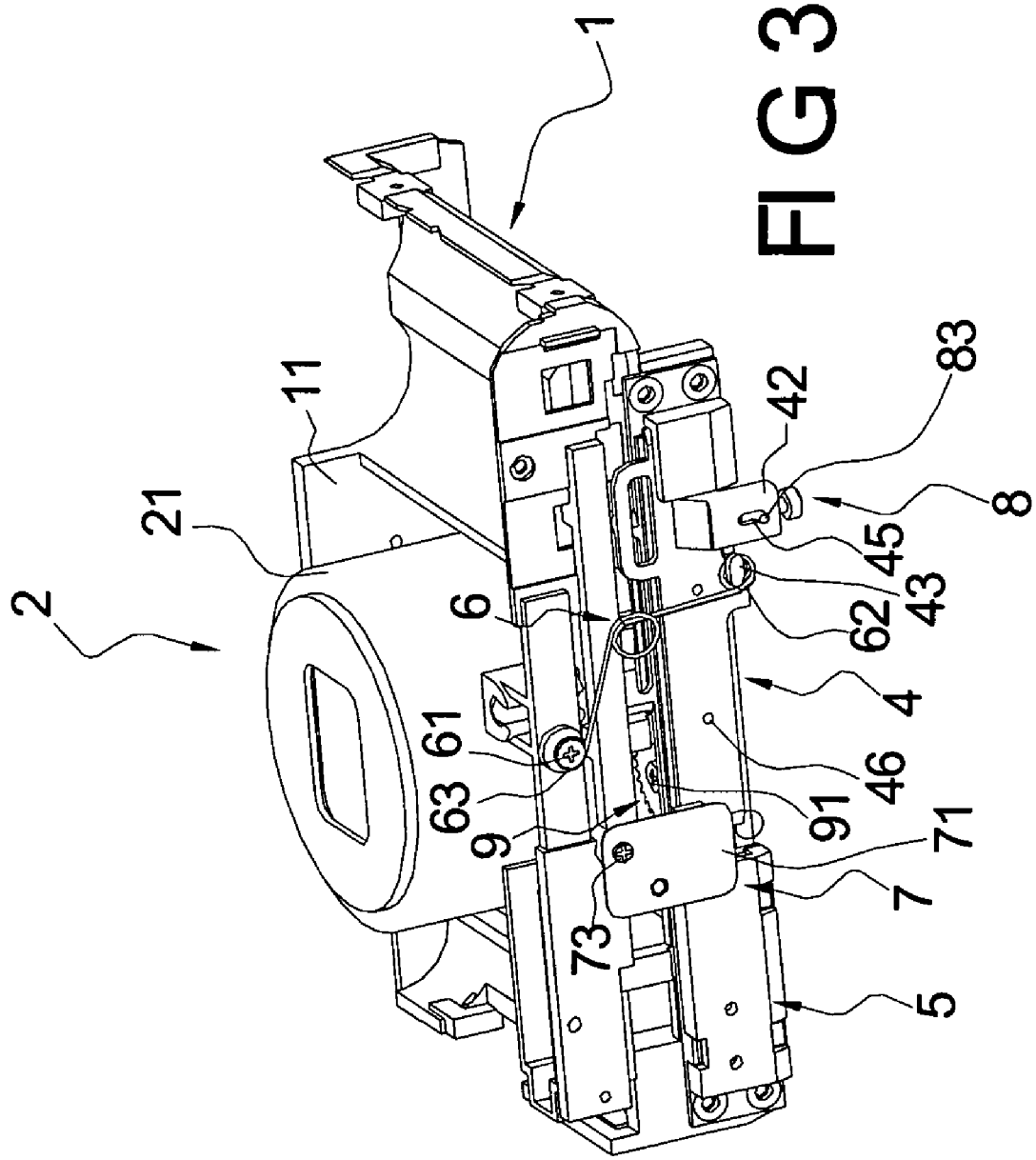
FIG. 3 is another perspective view of the manually adjustable apparatus for a zoom lens of the present invention.
Figure 4:
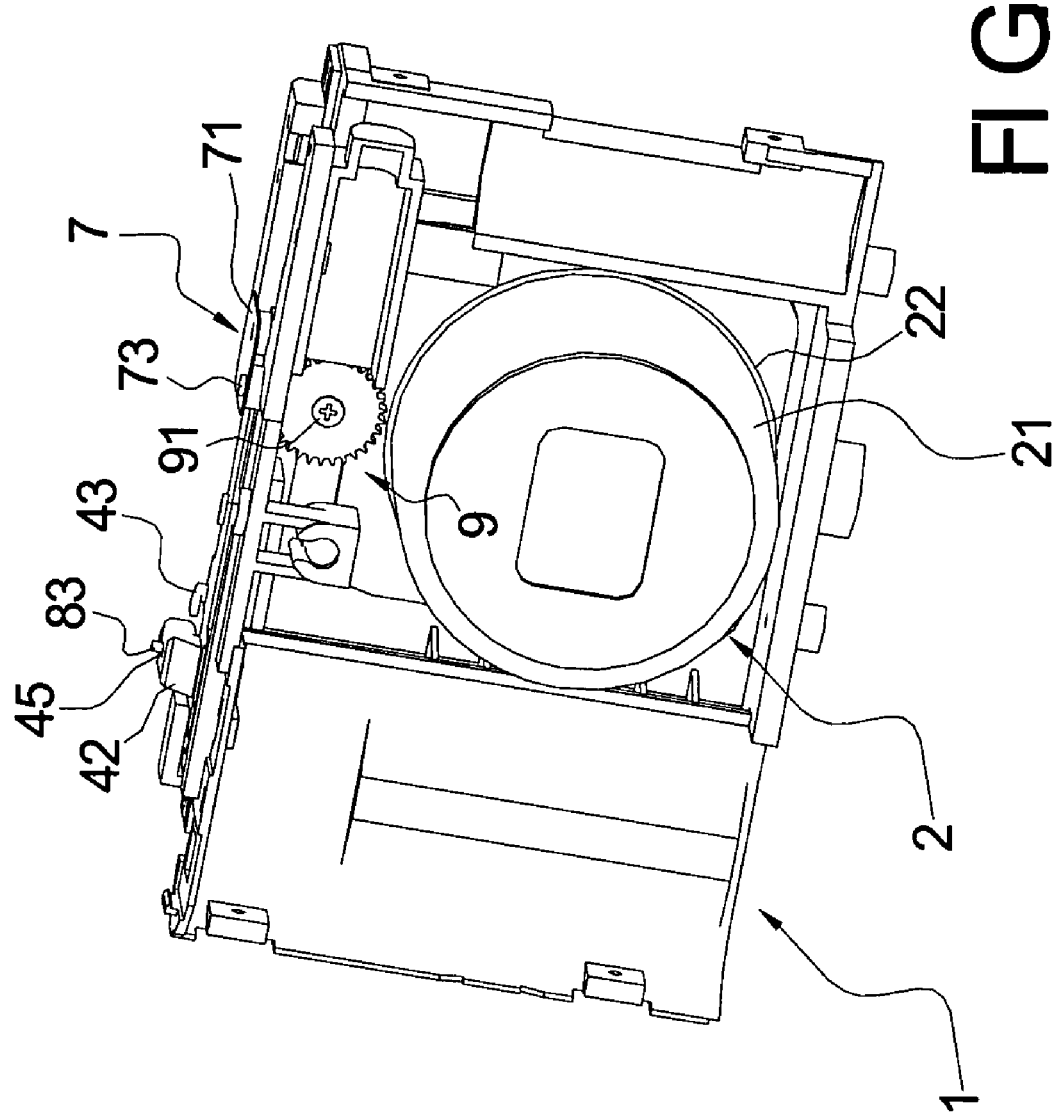
FIG. 4 is a further perspective view of the manually adjustable apparatus for a zoom lens of the present invention.
Figure 5:
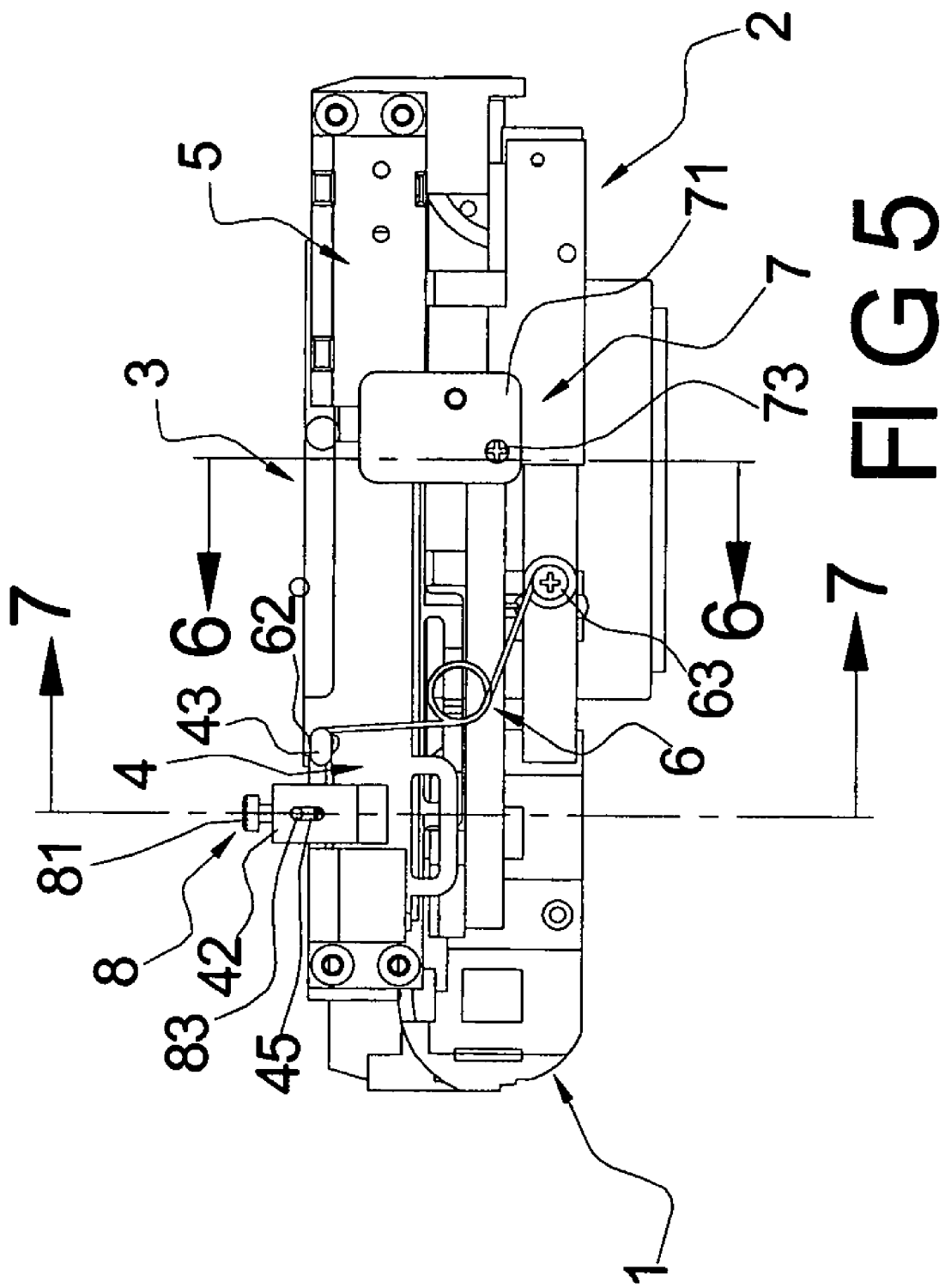
FIG. 5 is a top view of the manually adjustable apparatus for a zoom lens of the present invention.

Reference is made to FIGS. 1~5. The manually adjustable apparatus for a zoom lens of the present invention includes a body 1, a lens set 2, a sliding base 3, a rack sliding base 4, a positioning base 5, a button-spring device 6, a positioning device 7, and a self-locking device 8. The body 1 is a structure installed in the inner part of a housing (not shown in the figure) of a still camera. A receiving space 11 is formed in the body 1 and the lens set 2 is received in the receiving space 11. The lens set 2 is properly fastened and installed at the body 1. The lens set 2 has a zooming lens cone 21 and an outer gear 22 is located and surrounds the rear end of the zooming lens cone 21. When the outer gear 22 is driven, the outer gear 22 makes the lens cone 21 move so as to zoom the lens.

The sliding base 3 has a rectangular shape. At the four corners of the sliding base 3, screws 31 are used to lock the sliding base 3 on the top of the body 1. The sliding base 3 has a rectangular slot 32. The rectangular slot 32 extends to a predetermined distance along the sliding base 3. The rectangular slot 32 passes through the top surface and the bottom surface of the sliding base 3. There is a protruding strip 33 at the rear edge of the sliding base 3. There are a plurality of locking slots 34 indented on the protruding strip 33 for attaching the self-locking device 8. In this embodiment, there are three locking slots 34.

The length of the rack sliding base 4 is shorter than the length of the sliding base 3. Viewed from the cross-section, the rack sliding base 4 has a T-shape. The rack sliding base 4 is movably installed at the sliding base 3 and the lower half of the rack sliding base 4 is fitted into the rectangular slot 32 so that the rack sliding base 4 is movable installed at the sliding base 3 and can move left and right. There is a rack 41 located at the bottom surface of the rack sliding base 4. The rack 4 is exposed from the bottom surface of the sliding base 3 via the rectangular slot 32. At the body 1, a pivoting shaft 9 is used for pivoting a transmission gear 9 with the body 1. The transmission gear 9 is located between the rack 41 and the outer gear 22, and the transmission gear 9 individually is interlocked with the rack 41 and the outer gear 22. When the rack sliding base 4 moves left or right, the racking sliding base 4 makes the lens cone 21 rotate and move via the rack 41, the transmission gear 9 and the outer gear 22 so as to control and zoom the lens.

A link-moving part 42 and a protruding column 43 protrude from the top surface of the rack sliding base 4. The link-moving part 42 connects with a switch (not shown in the figure) located at the outside of the housing of the still camera. The switch is pushed left or right to make the rack sliding base 4 move left or right so as to drive the lens cone 21 for zooming the lens. There is an assembly hole 44 at the rear end of the link-moving part 42. The assembly hole 44 horizontally extends into the inner part of the link-moving part 42. A rectangular through hole 45 vertically passes through the link-moving part 42. The rectangular through hole 45 passes through the top surface and the bottom surface of the link-moving part 42, and the rectangular through hole 45 and the assembly hole 44 vertically cross each other and is installed with the self-locking device 8. On the top surface of the rack sliding base 4, there are a plurality of positioning holes 46 used for attaching with the positioning device 7. In this embodiment, there are three positioning holes 46 that are used for individually positioning the lens set at the locations of closed lens, wide-angled pictures, and telephoto pictures.

The cross-section of the positioning base 5 has an inverse-U shape and is fastened to the sliding base 3 via a wedging method, a gluing method, or a screwing method. The positioning base 5 covers the rack sliding base 4 and slightly presses the top surface of the rack sliding base 4 to provide the force to guide and restrict the rack sliding base 4. Therefore, the rack sliding base 4 can stably and slidably move on the sliding base 3.

The button-spring device 6 is a button-spring having a first end part 61 and a second end part 62. The first end part 61 is fastened to the top surface of the body 1 via a screw 63. The second end part 62 is disposed around the protruding column 43 of the rack sliding base 4 to install the button-spring device 6 between the body 1 and the rack sliding base 4. Thereby, a flexible force is provided to the rack sliding base 4 so as to move the rack sliding base 4 to the locations of closed lens, wide-angled pictures, and telephoto pictures.

Figure 6:
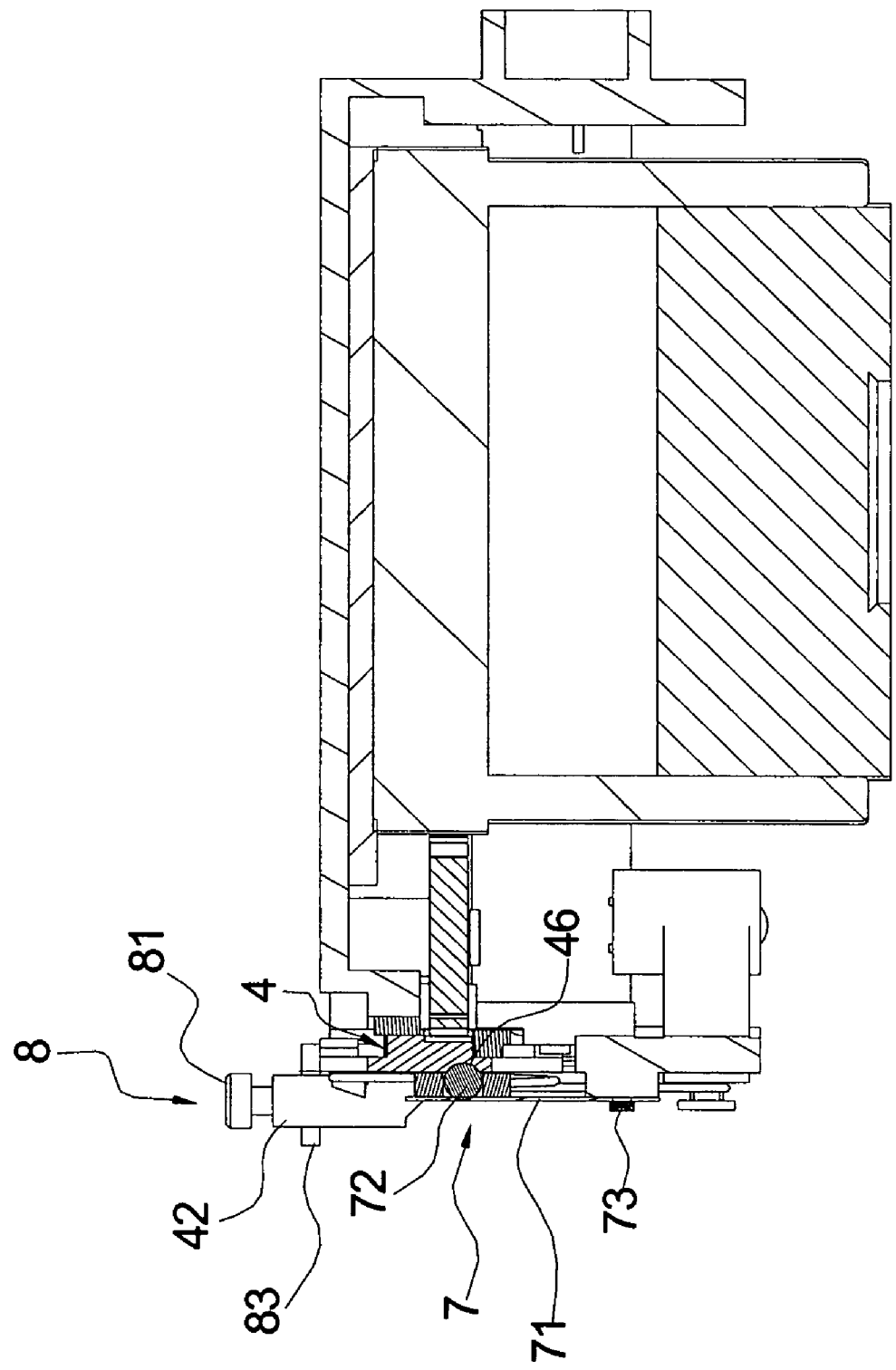
FIG. 6 is a cross-sectional view of cross-section 6—6 of FIG. 5.

The positioning device 7 includes a pressing board 71 and a steel ball 72. The pressing board 71 is screwed on the top surface of the body 1 via a screw 73 (as shown in FIG. 6). The steel ball 72 is located under the pressing board 71. The steel ball 72 is flexibly pressed by the pressing board 71 to make the steel ball 72 selectively positioned in the positioning holes 46 located at the rack sliding base 4. Therefore, when the rack sliding base 4 is moved to a positioning location, the flexible force of the pressing board 71 is used to make the steel ball 72 flexibly wedge into the corresponding positioning holes 46 for moving and positioning. Thereby, the rack sliding base is moved to the locations of closed lens, wide-angled pictures, and telephoto pictures, and is positioned stably.

Figure 7:
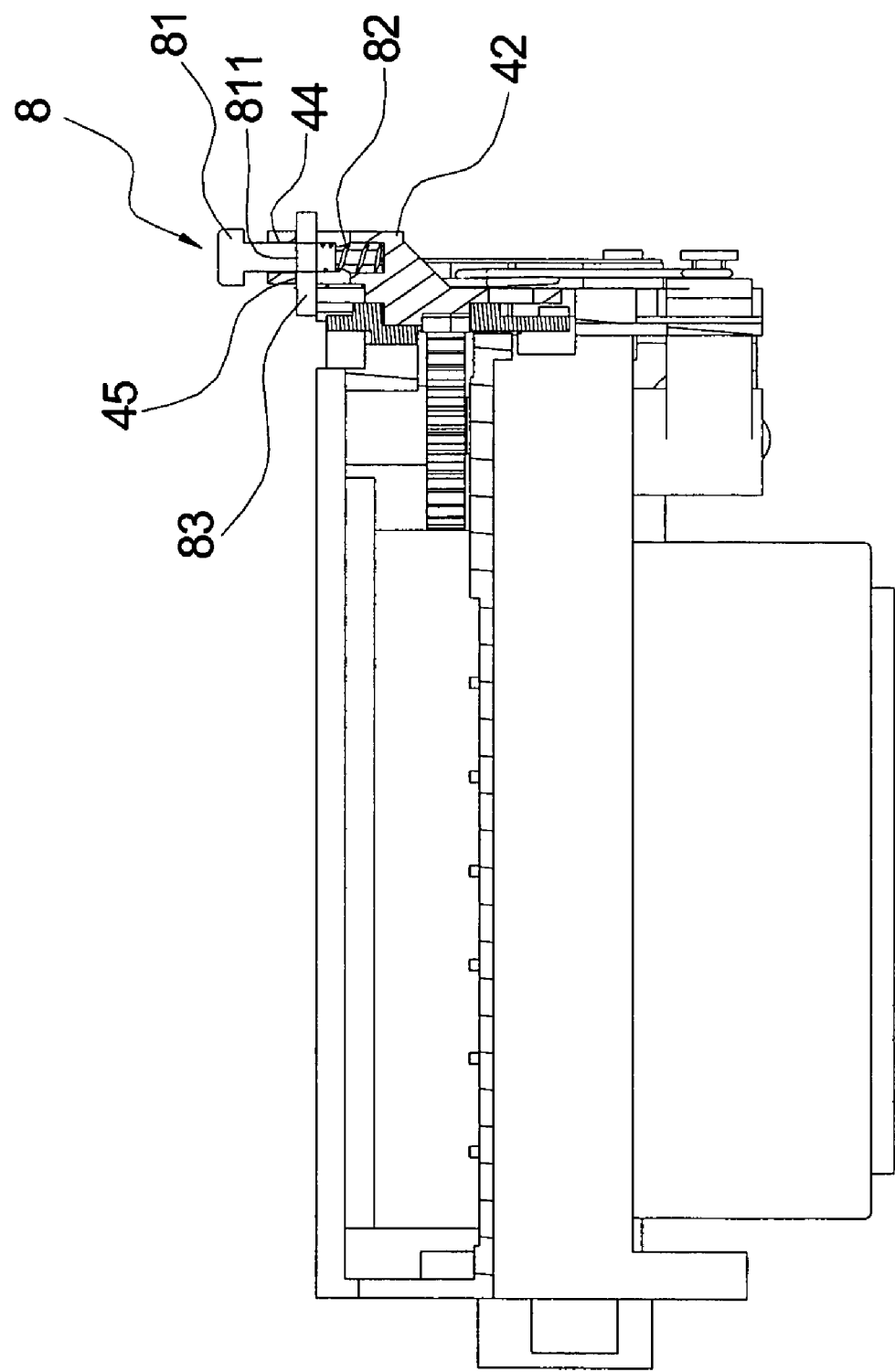
FIG. 7 is a cross-sectional view of cross-section 7—7 of FIG. 5.

The self-locking device 8 includes a self-locking key 81, a spring 82, and a positioning shaft 83 (as shown in FIG. 7). The self-locking key 81 is plugged into the assembly hole 44 of the link-moving part 42 of the rack sliding base 4. The spring 82 is located between the self-locking key 81 and the assembly hole 44 for contacting and pushing the self-locking key 81 to move backward. The positioning shaft 83 is plugged into the rectangular through hole 45 and a hole 811 corresponding to the self-locking key 81 for positioning the self-locking key 81 in the assembly hole 44. The spring 82 is used for pushing the self-locking key 81 and the positioning shaft 83 to make the self-locking key 81 and the positioning shaft 83 move backward. Thereby, the lower end of the positioning shaft 83 is plugged and wedged into the corresponding locking slot 34 to lock the rack sliding base 4 and locks when the rack sliding base 4 slidably moves to the desired location. When the user wants to move the rack sliding base 4, the user merely needs to press the self-locking key 81 so that the self-locking key 81 and the positioning shaft 83 move forward. Therefore, the lower end of the positioning shaft 83 is removed from the locking slot 34. It is easy to use the switch (not shown in the figure) to make the rack sliding base 4 drive the lens cone 31 to rotate and move. Thereby, the lens is a zoom lens.

The present invention turns the rack sliding base 4 by a manual method to make the lens cone 21 rotate and move via the rack 41, the transmission gear 9, and the outer gear 22 for controlling and zooming the lens set. No power is required so the power loading of the still camera is reduced. The problem of repeatedly recharging batteries is overcome. The cost of the still camera is reduced due to the motor being omitted.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A manually adjustable apparatus for a zoom lens, comprising:
   a body having a receiving space;
   a lens set received in the receiving space of the body, wherein the lens set has a zooming lens cone and an outer gear surrounds the lens cone;
   a sliding base fastened at the body;
   a rack sliding base movably installed at the sliding base, wherein the rack sliding base has a rack; and
   a transmission gear interlocked with the rack and the outer gear;
   wherein the rack sliding base includes a link-moving part through which the rack sliding base is displaced relative to the sliding base in opposing directions for rotating the outer gear surrounding the zooming lens cone through the transmission gear to reversibly control the zooming of the lens.

2. The manually adjustable apparatus for a zoom lens as claimed in claim 1, wherein the sliding base has a rectangular slot, and the rectangular slot passes through a top surface and a bottom surface of the sliding base, a lower half part of the rack sliding base being received in the rectangular slot and thereby exposing a rack disposed on the bottom surface of the rack sliding base to the bottom surface of the sliding base via the rectangular slot.

3. The manually adjustable apparatus for a zoom lens as claimed in claim 1, wherein the sliding base comprises a positioning base, and the positioning base covers the rack sliding base.

4. The manually adjustable apparatus for a zoom lens as claimed in claim 1, wherein the transmission gear is pivoted onto the body via a pivoting shaft.

5. The manually adjustable apparatus for a zoom lens as claimed in claim 1, further comprising a button-spring device, wherein the button-spring device is located between the rack sliding base and the body.

6. The manually adjustable apparatus for a zoom lens as claimed in claim 5, wherein the button-spring device comprises a first end part and a second end part, the first end part is fastened to the body, the rack sliding base has a protruding column, and the second end part is disposed around the protruding column.

7. The manually adjustable apparatus for a zoom lens as claimed in claim 1, further comprising a positioning device, wherein the positioning device comprises a pressing board and a steel ball, the pressing board is fastened on the body, the steel ball is flexibly pressed by the pressing board, the rack sliding base comprises a plurality of positioning holes, and the steel ball is selectively positioned in the positioning holes of the rack sliding base.

8. The manually adjustable apparatus for a zoom lens as claimed in claim 1, further comprising a self-locking device, wherein the self-locking device comprises a self-locking key, a spring, and a positioning shaft, there being a plurality of locking slots disposed on the sliding base, the rack sliding base comprises an assembly hole and a rectangular through hole that are vertically crossed, the self-locking key being plugged into the assembly hole, the positioning shaft being plugged into the rectangular through hole and a hole corresponding to the self-locking key, the spring being disposed between the self-locking key and the assembly hole for contacting and pushing the self-locking key and the positioning shaft to make the positioning shaft wedge into the corresponding locking slot of the sliding base.

* * * * *